United States Patent
Percival et al.

(10) Patent No.: US 11,484,867 B2
(45) Date of Patent: Nov. 1, 2022

(54) ELECTROCATALYST COMPRISING A CRUMPLED TRANSITION METAL DICHALCOGENIDE SUPPORT LOADED WITH MONODISPERSED METAL NANOPARTICLES

(71) Applicants: National Technology & Engineering Solutions of Sandia, LLC, Albuquerque, NM (US); UNM Rainforest Innovations, Albuquerque, NM (US)

(72) Inventors: Stephen Percival, Albuquerque, NM (US); James Eujin Park, Albuquerque, NM (US); Ivana Gonzales, Santa Fe, NM (US); Stanley Shihyao Chou, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 155 days.

(21) Appl. No.: 17/094,040

(22) Filed: Nov. 10, 2020

(65) Prior Publication Data

US 2022/0143585 A1 May 12, 2022

(51) Int. Cl.
  *B01J 27/051* (2006.01)
  *B01J 35/00* (2006.01)
  (Continued)

(52) U.S. Cl.
  CPC ......... *B01J 27/0515* (2013.01); *B01J 35/006* (2013.01); *B01J 35/0033* (2013.01);
  (Continued)

(58) Field of Classification Search
  CPC .. B01J 27/0515; B01J 35/0033; B01J 35/006; B01J 37/08; B01J 37/16; B01J 23/38;
  (Continued)

(56) References Cited

U.S. PATENT DOCUMENTS

| | | | | | |
|---|---|---|---|---|---|
| 4,299,892 A | * | 11/1981 | Dines | ...... | C01G 31/00 |
| | | | | | 429/339 |
| 4,323,480 A | * | 4/1982 | Dines | ...... | C01G 31/00 |
| | | | | | 502/220 |
| 2019/0003064 A1 | | 1/2019 | Chou et al. | | |

FOREIGN PATENT DOCUMENTS

| | | | | | |
|---|---|---|---|---|---|
| GB | 1564519 A | * | 4/1980 | ............ | B82Y 30/00 |
| WO | WO 2017/070690 | * | 4/2017 | ............... | B82B 3/00 |
| WO | WO-2020170132 A1 | * | 8/2020 | ............ | B01J 23/462 |

OTHER PUBLICATIONS

Yanguang Li et al., "MoS2 Nanoparticles Grown on Graphene: An Advanced Catalyst for the Hydrogen Evolution Reaction." Journal of the American Chemical Society, 133, pp. 7296-7299. (Year: 2011).*

(Continued)

*Primary Examiner* — Patricia L. Hailey
(74) *Attorney, Agent, or Firm* — Kevin W. Bieg

(57) ABSTRACT

An electrocatalyst comprises a crumpled transition metal dichalcogenide support loaded with catalytic metal nanoparticles through spontaneous reduction reactions. The support can be prepared by hydrothermal conversion of 2D nanosheets to 3D hierarchically crumpled sheets. As an example, using crumpled $MoS_2$ as a support, highly tunable Ru loadings were obtained using the electrostatic interaction between $MoS_2$ and $RuCl_3$ in solution. Control over Ru loading was leveraged to produce $Ru$—$MoS_2$ electrocatalysts that demonstrate different nitrogen reduction reaction activities, and which show varying resistance to electrochemical sintering and deactivation. Further, these high surface area materials can be utilized for many applications, including electrocatalysts, supercapacitors, and batteries.

20 Claims, 6 Drawing Sheets

(51) Int. Cl.
- *B01J 37/16* (2006.01)
- *B01J 37/08* (2006.01)
- *B82Y 40/00* (2011.01)
- *B82Y 30/00* (2011.01)

(52) U.S. Cl.
CPC .............. *B01J 37/08* (2013.01); *B01J 37/16* (2013.01); *B82Y 30/00* (2013.01); *B82Y 40/00* (2013.01)

(58) Field of Classification Search
CPC ...... B01J 27/057; C01B 32/182; B82Y 30/00; B82Y 40/00
USPC ................ 502/101, 220, 223, 325, 200, 203
See application file for complete search history.

(56) References Cited

OTHER PUBLICATIONS

Suryanto, B.H.R. et al., "MoS2 Polymorphic Engineering Enhances Selectivity in the Electrochemical Reduction of Nitrogen to Ammonia," ACS Energy Letters, 2019, vol. 4, pp. 430-435.
Azofra, L.M. et al., "Feasibility of $N_2$ Binding and Reduction into Ammonia at Fe-Deposited $MoS_2$ 2D sheets: A DFT Study", Chemistry A European Journal, 2017, vol. 23 pp. 8275-8279.
Zhang, H. et al., "$MoS_2$-Supported $Fe_2$ Clusters Catalyzing Nitrogen Reduction Reaction to Produce Ammonia," Journal of Physical Chemistry C, 2020, vol. 124, pp. 6260-6266.
Zhao, X. et al., "Fe Nanodot-Decorated $MoS_2$ Nanosheets on Carbon Cloth: An Efficient and Flexible Electrode for Ambient Ammonia Synthesis," Journal of Materials Chemistry A, 2019, vol. 7, pp. 27417-27422.
Li, S-J., et al., "Amorphizing an Au Nanoparticles by $CeO_x$—RGO Hybrid Support towards Highly Efficient Electrocatalyst for $N_2$ Reduction under Ambient Conditions," Advanced Materials, 2017, vol. 29, 1700001, 6 pages.
Shi, M-M., et al., "Au Sub-Nanoclusters on $TiO_2$ towards Highly Efficient and Selective Electrocatalyst for $N_2$ Conversion to $NH_3$ at Ambient Conditions," Advanced Materials, 2017, vol. 29, 1606550, 6 pages.
Foster, S. L. et al., "Catalysts for Nitrogen Reduction to Ammonia," Nature Catalysis, 2018, vol. 1, 490.
Huang, X. et al., "Solution-Phase Epitaxial Growth of Noble Metal Nanostructures on Dispersible Single-Layer Molybdenum Disulfide Nanosheets," Nature Communications, 2013, vol. 1, 1444.
Kim, J. et al., "Enhanced Electrocatalytic Properties of Transition-Metal Dichalcogenides Sheets by Spontaneous Gold Nanoparticle Decoration," Journal of Physical Chemistry Letters, 2013, vol. 4, pp. 1227-1232.
Chen, Y-C., et al., "Structurally Deformed $MoS_2$ for Electrochemically Stable, Thermally Resistant and Highly Efficient Hydrogen Evolution Reaction," Advanced Materials, 2017, vol. 29, 1703863, 11 pages.
Joensen, P. et al., "Single-Layer $MoS_2$," Materials Research Bulletin, 1986, vol. 21, pp. 457 461.
Chou, S.S. et al., "Ligand Conjugation of Chemically Exfoliated $MoS_2$," Journal of the American Chemical Society, 2013, vol. 135, pp. 4584-4587.
Chou, S.S. et al., "Controlling the Metal to Semiconductor Transition of $MoS_2$ and $WS_2$ in Solution," Journal of the American Chemical Society, 2015, vol. 137, pp. 1742-1745.
Chou, S.S. et al., "Understanding Catalysis in a Multiphasic Two-Dimensional Transition Metal Dichalcogenide," Nature Communications, 2015, vol. 6, 8311, 8 pages.
Karunakaran, S. et al., "Simultaneous Exfoliation and Functionalization of 2H-$MoS_2$ by Thiolated Surfactants: Applications in Enhanced Antibacterial Activity," Journal of the American Chemical Society, 2018, vol. 140, pp. 12634-12644.
Eda, G. et al., "Photoluminescence from Chemically Exfoliated $MoS_2$," Nano Lett., 2011, vol. 11, pp. 5111-5116.
Lee, S. Y. et al., "Large Work Function Modulation of Monolayer $MoS_2$ by Ambient Gases," ACS Nano, 2016, vol. 10, pp. 6100-6107.
Skulason, E. et al., "A Theoretical Evaluation of Possible Transition Metal Electro-Catalyst for $N_2$ Reduction," Phys. Chem. Chem. Phys., 2012, vol. 14, pp. 1235-1245.
Alvarez, A. E. et al., "Synthesis and Characterization of Three-Dimensional Porous Cu@Pt and Cu@Pt-Ru Catalysts for Methanol Oxidation," ChemCatChem, 2017, vol. 9, pp. 853-861.
Back, S. and Jung, Y., "On the Mechanism of Electrochemical Ammonia Synthesis on the Ru Catalyst," Phys. Chem. Chem. Phys., 2016, vol. 18, pp. 9161-9166.
Matanovic, I. et al., "Towards Defect Engineering in Hexagonal $MoS_2$ Nanosheets for Tuning Hydrogen Evolution and Nitrogen Reduction Reactions," Applied Materials Today, 2020, vol. 21, 100812, 10 pages.

\* cited by examiner

ELECTROCATALYST COMPRISING A CRUMPLED TRANSITION METAL DICHALCOGENIDE SUPPORT LOADED WITH MONODISPERSED METAL NANOPARTICLES

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to catalysts and, in particular, to an electrocatalyst comprising a rumpled transition metal dichalcogenide support loaded with monodisperse metal nanoparticles.

BACKGROUND OF THE INVENTION

Ammonia is one of the most commonly produced industrial chemicals, generally synthesized through the hydrogenation of $N_2$ molecules at high temperatures and pressures through the energy intensive Haber-Bosch process. See T. Kandemir et al., *Angew. Chem. Int. Ed.* 52(48), 12723 (2013); J. N. Galloway et al., *Science* 320(5878), 889 (2008); and J. W. Erisman et al., *Nat. Geosci.* 1(10), 636 (2008). Consequently, there has been a global effort to reimagine methods of ammonia synthesis, to achieve lower energy cost, reduced infrastructure and reduced greenhouse gas emissions. See Sabine Brueske, Carol Kramer, and Aaron Fisher, *Bandwidth Study on Energy Use and Potential Energy Saving Opportunities in U.S. Chemical Manufacturing*, Energetics (2015); and L. Wang et al., *Joule* 2(6), 1055 (2018). Electrochemical nitrogen reduction reaction (NRR) in aqueous electrolytes has been an emerging field to provide a benign method for ammonia production in comparison to the Haber-Bosch process. See S. L. Foster et al., *Nat. Catal.* 1(7), 490 (2018); and X. Guo et al., *J. Mater. Chem. A* 7(8), 3531 (2019). This challenge, however, is compounded by the overlap in electrochemical potential window between NRR and the hydrogen evolution reaction (HER), a competitive reaction that reduces the Faradaic efficiency (FE) of $NH_3$ production.

Recently, a slew of NRR catalysts have been reported including metal-based and metal-free catalysts, 2D transition metal carbide and nitride (MXene), and 2D transition metal dichalcogenides (TMD). See X. Guo et al., *J. Mater. Chem. A* 7(8), 3531 (2019); G. Qing et al., *Chem. Rev.* 120(12), 5437 (2020); A. Liu et al., *ChemSusChem* 13(15), 3766 (2020); Y. Luo et al., *Joule* 3(1), 279 (2019); J. Zhao et al., *J. Mater. Chem. A* 6(47), 24031 (2018); L. R. Johnson et al., *ACS Catal.* 10(1), 253 (2020); L. Zhang et al., *Adv. Mater.* 30(28), 1800191 (2018); X. Li et al., *Adv. Energy Mater.* 8(30), 1801357 (2018); J. Zhang et al., *J. Am. Chem. Soc.* 141(49), 19269 (2019); and B. H. R. Suryanto et al., *ACS Energy Lett.* 4(2), 430 (2019). Additionally, a viable catalyst design strategy has been depositing NRR active metal species on a secondary support material with 2D material. See B. H. R. Suryanto et al., *ACS Energy Lett.* 4(2), 430 (2019); L. M. Azofra et al., *Chem. Eur. J.* 23(34), 8275 (2017); and H. Zhang et al., *J. Phys. Chem. C* 124(11), 6260 (2020). Some examples include Fe-decorated $MoS_2$, nanoparticles of Au on a bi-substrate of $CeO_x$-reduced graphite oxide, and Au on $TiO_2$. See X. Zhao et al., *J. Mater. Chem. A* 7(48), 27417 (2019); S. J. Li et al., *Adv. Mater.* 29(33), 1700001 (2017); and M.-M. Shi et al., *Adv. Mater.* 29(17), 1606550 (2017). Lastly, Suryanto et al. recently demonstrated Ru-deposited $MoS_2$ to show NRR activity through the interplay between $N_2$ binding sites from the deposited metal and hydrogenation from the $MoS_2$ support. See B. H. R. Suryanto et al., *ACS Energy Lett.* 4(2), 430 (2019). Along with being an earth abundant material with previously high catalytic activities, $MoS_2$ is of particular interest due to potentially providing a platform for mimicking the NRR enzyme, nitrogenase, as well as being easily modified with metal nanoparticles. See S. L. Foster et al., *Nat. Catal.* 1(7), 490 (2018); L. M. Azofra et al., *Chem. Eur. J.* 23(34), 8275 (2017); X. Huang et al., *Nat. Commun.* 4(1), 1444 (2013); and J. Kim et al., *J. Phys. Chem. Lett.* 4(8), 1227 (2013)

However, using metal particles as active catalytic sites to enhance the capabilities of a 2D material can present unique challenges. For example, it is well known in electrochemical systems that metallic diffusion of unsupported catalyst particles and sintering under bias can affect the performance of the catalyst. In particular, one may expect particle size evolution in the electrochemical environment, due to solution pH effects and applied potentials. See R. Borup et al., *Chem. Rev.* 107(10), 3904 (2007). Thus, metal loading and electrochemical operational conditions need to be considered when developing catalyst synthesis procedures for optimizing electrocatalytic performance, as well as operating conditions that induce sintering and catalytic deactivation. In particular, the optimal particle size and density needs to be maintained during electrocatalysis for maximized catalytic activity.

SUMMARY OF THE INVENTION

The present invention is directed to an electrocatalyst, comprising a plurality of catalytic metal nanoparticles monodispersed on a surface of a crumpled transition metal dichalcogenide support. For example, the transition metal can comprise molybdenum, tungsten, cobalt, hafnium, rhenium, platinum, palladium, or zirconium and the chalcogenide can comprise sulfur, selenium, tellurium, or oxygen. For example, the catalytic metal can comprise gold, rhenium, or a platinum-group metal, such as platinum, iridium, palladium, ruthenium, rhodium, or osmium. The plurality of catalytic metal nanoparticles can cover from between 1% and 50% of the surface area of the crumpled transition metal dichalcogenide support. The size of the catalytic metal nanoparticles can be approximately 1 nm.

The invention is further directed to a method for preparing hierarchically crumpled sheets of a layered material, comprising providing exfoliated sheets of the layered material, sealing the exfoliated sheets in a pressure vessel along with water, and heating the sealed pressure vessel at an elevated temperature sufficient to hydrothermally convert the exfoliated sheets to hierarchically crumpled sheets of the layered material. For example, the layered material can comprise a metal dichalcogenide, comprising a metal such as Mo, W, Cu, Co, Ni, Ti, Fe, Cr, Zr, Sn, or Ge, and a chalcogenide, such as O, S, Se, or Te. The method can further comprise loading, or decorating, a surface of the hierarchically crumpled sheets of metal dichalcogenide with monodispersed nanoparticles of one or more of gold, rhenium, or platinum-group metals or alloys by a spontaneous reduction of the gold, rhenium, or platinum-group metal ions on the surface of the hierarchically crumpled sheets of metal dichalcogenide to provide an electrocatalyst. For example, the one or more platinum-group metals can comprise platinum, iridium, palladium, ruthenium, rhodium, or osmium. The method can be used with other layered materials, such as graphene or boron nitride.

As an example of the invention, a support was prepared by hydrothermal conversion of 2D nanosheets of molybdenum disulfide to 3D hierarchically crumpled sheets. The crumpled molybdenum disulfide support was loaded, or decorated, with monodisperse ruthenium nanoparticles to provide a Ru—MoS$_2$ electrocatalyst. Spontaneous reduction of metal cations at MoS$_2$ and related transition metal dichalcogenide interfaces produce metal particles of controlled size and loading. This affords better control of sintering rates during electrochemical applications. Specifically, Ru particle sintering can be decreased by lowering the Ru loading, where the resulting Ru nanoparticles occupy a much lower percent of the exposed surface area. The resulting lower local surface concentration increases the stability of the particles and prevents them from translocating on the MoS$_2$ surface whereby they would be more likely to encounter another particle and agglomerate forming larger particles. The stabilized, smaller particles are found to be more active for the NRR by showing a larger FE and production rate than the larger particles (higher loading catalyst) but also displays a peak FE at a lower NRR overpotential. The experimental findings were corroborated with density functional theory (DFT) calculations, which show a reducing trend in N$_2$ affinity with increasing Ru size. Additionally, DFT revealed an increase in the energy barrier of the rate limiting step as particle sizes increase, as is the case of sintering.

BRIEF DESCRIPTION OF THE DRAWINGS

The detailed description will refer to the following drawings, wherein like elements are referred to by like numbers.

DETAILED DESCRIPTION OF THE INVENTION

Figure 1B:
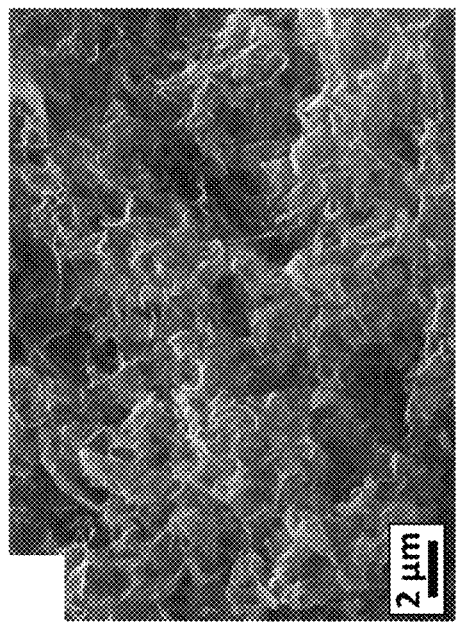
FIG. 1B is a SEM image of hierarchically crumpled 2H—MoS$_2$ obtained from the hydrothermal conversion treatment of exfoliated MoS$_2$.

The present invention is directed to a hierarchically crumpled transition metal dichalcogenide support loaded with catalytic metal nanoparticles through spontaneous reduction reactions. As an example, MoS$_2$ was used as the transition metal dichalcogenide in the description below, although other variants with the chemical composition of MX$_2$, where M is a transition metal (M=Mo, W, Co, Hf, Re, Pt, Pd, Zr, etc.) and X is a chalcogenide (S, Se, Te, O), can also be used. As an example, Ru was used as the catalytic metal nanoparticle in the description below, although other platinum-group metals can also be used (Pt, Ir, Pd, Rh, Ru, Os). Using crumpled MoS$_2$ as a support, highly tunable Ru loadings can be obtained using the electrostatic interaction between MoS$_2$ and RuCl$_3$ in solution. Control over Ru loading can be leveraged to produce electrocatalysts that demonstrate different NRR activities and which show varying resistance to electrochemical sintering and deactivation. Experiments and DFT were used to evaluate size dependent effects on the activation energy of NRR. In all, it was found that decreasing the Ru particle size improves the NRR activity by stabilizing key nitrogen intermediates during NRR to lower the activation energy. The invention enables the engineering of MoS$_2$ structures and composites for NRR electrocatalysis, enabling a highly active electrocatalyst when Ru can be stabilized at the atomic limit.

Hydrothermal Conversion to Form Crumpled Transition Metal Dichalcogenide Sheets To significantly increase the active site density of typical electrocatalysts where catalytically active transition metal atoms can be deposited, the surface area of the support needs to be increased. A significant increase in surface area is obtained in exfoliating bulk materials into 2D nanosheets. However, maintaining this dramatic increase in available surface area can be a challenge. When these 2D materials are deposited onto a support or electrode surface, the sheets will prefer to minimize the interfacial energy by laying face-to-face with other sheets. This conformal deposition will lead a loss of available surface area. To prevent this conformal deposition, many groups have used processes to give the sheets some 3D texture, largely preventing the sheets from re-assembling during deposition. See Y.-C. Chen et al., *Adv. Mater.* 29, 1703863 (2017). However, these processes involve many steps and can involve harsh chemicals that need to be disposed of, which increase time and cost of producing the desired high surface area assembly.

The present invention provides for the synthesis of high surface area assemblies of textured transition metal dichalcogenide sheets in a one-step hydrothermal conversion of exfoliated 2D nanosheets. Once the transition metal dichalcogenide is exfoliated, producing polar 2D nanosheets, they are sealed in a pressure vessel along with a polar solvent and placed in an oven at an elevated temperature, typically greater than the boiling temperature of the polar solvent, wherein the 2D nanosheets undergo a hydrothermal conversion process to 3D crumpled sheets. Although not wanting to be held to any particular theory, it is believed that the turbulence from evaporative boiling is responsible for the crumpling. Likely, the exfoliated nanosheets form a bubble interface, or are trapped in the droplets and wrinkle as the bubble/droplets shrink/evaporate. Exemplary polar solvents include water, ethanol, dimethylformamide, and dimethylsulphoxide, although other polar solvents can also be used. Water is a convenient polar solvent, since it has a relatively low boiling temperature (100° C.) and evaporates cleanly with little residual. The hydrothermal conversion process is environmentally friendly and low cost as it does not utilize harsh chemicals or solvents. As will be described below, this hydrothermal conversion process has been demonstrated with $MoS_2$ but can be used with other transition metal dichalcogenides with the general formula of $MX_2$. For example, M can be a transition metal atom, such as Mo, Cr, W, Cu, Co, Ni, Ti, Fe, Cr, or Zr. For example, X can be a chalcogen atom, such as O, S, Se, or Te. The hydrothermal conversion method may also be used to prepare 3D crumpled materials from other 2D layered materials, such as other metal dichalcogenides (e.g., $SnSe_2$ and $GeSe_2$), graphene, or boron nitride.

Figure 1D:
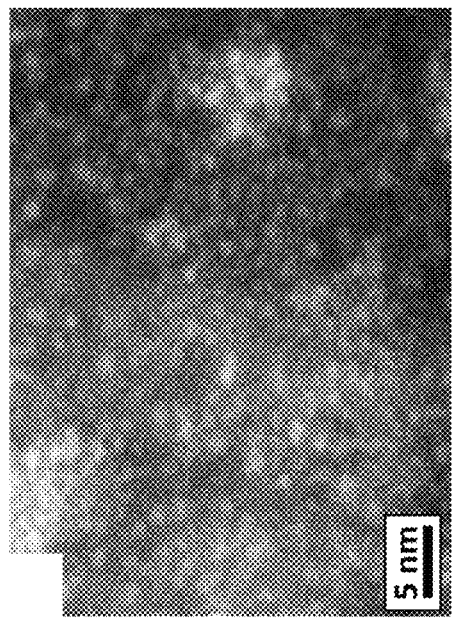
FIG. 1D is a TEM image of a high loading Ru—MoS$_2$ catalyst.
Figure 1A:
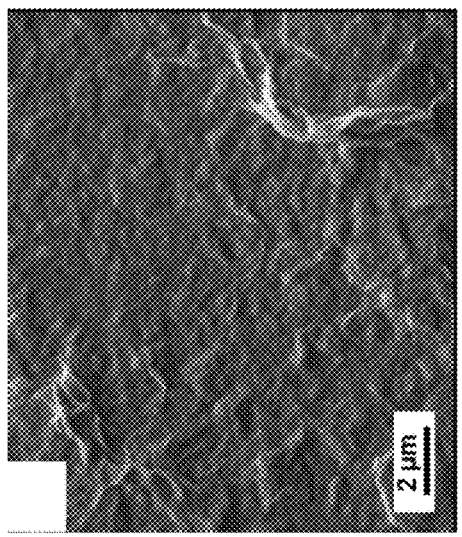
FIG. 1A is a scanning electron microscope (SEM) image of exfoliated MoS$_2$ deposited on silicon before hydrothermal conversion.

To synthesize the exemplary hierarchically crumpled $MoS_2$ sheets, exfoliated $MoS_2$ was first obtained through an n-butyl lithium intercalation method described elsewhere. See P. Joensen et al., *Mater. Res. Bull.* 21(4), 457 (1986); S. S. Chou et al., *J. Am. Chem. Soc.* 135(12), 4584 (2013); and U.S. Publ. No. 2019/0003064, which are incorporated herein by reference. $MoS_2$ nanosheets were first formed from lithium intercalation by stirring 1 g of molybdenum disulfide ($MoS_2$) in 10 mL of 0.8 M n-butyl lithium under Ar atmosphere for 5-7 days. See S. S. Chou et al., *J. Am. Chem. Soc.* 137, 1742 (2015). The mixture was then quenched with DI water and sonicated to exfoliate the $MoS_2$ sheets. The large particles composed of poorly exfoliated $MoS_2$ were removed by centrifugation at 100 g for 3 minutes and discarded while keeping just the supernatant that contained the highly exfoliated sheets. FIG. 1A is a SEM image of exfoliated $MoS_2$ drop cast from solution onto silicon. The exfoliated $MoS_2$ is relatively flat and smooth in appearance. The exfoliated sheets were then washed with DI water three times with first centrifugation at 12000 g, decanting the liquid, and then redispersion of the soft pellet in water while sonicating. It has been described that electron donation from the intercalation process induces a phase transformation, distorting the lattice plane from the thermodynamically stable 2H phase to a metastable 1T' phase. See S. S. Chou et al., *Nat. Commun.* 6(1), 8311 (2015); S. Karunakaran et al., *J. Am. Chem. Soc.* 140(39), 12634 (2018); and S. S. Chou et al., *J. Am. Chem. Soc.* 137(5), 1742 (2015). Therefore, the exfoliated purified nanosheets were then hydrothermally treated at 150° C. which resulted in formation of the hierarchically crumpled 3D structure, as well as thermal conversion to 2H phase. See Y.-C. Chen et al., *Adv. Mater.* 29(44), 1703863 (2017); and G. Eda et al., *Nano Lett.* 11(12), 5111 (2011). Conversion to the 2H phase was verified using XPS. This phase change is important for electrocatalytic reactions in order to suppress the hydrogen evolution reaction. Additionally, changes of the interfacial electrostatic properties of the $MoS_2$ nanosheets results in an increased surface charge density of the hydrothermally converted $MoS_2$. The electrostatic charges of the nanosheets prevents the interfaces of the sheets from interacting and adhering together, thus preventing the conformal deposition. This then facilitates the deposition of the sheets into a crumpled-like fashion with much more of the surface area accessible. A SEM image of the crumpled $2H-MoS_2$ is shown in FIG. 1B. The hydrothermally treated sheets can be seen to form very rough, high surface area deposits that appear "crumpled" with a random network of ridges and facets. These high surface area materials can be utilized for many applications, including electrocatalysts, supercapacitors, and batteries.

Loading of Crumpled Transition Metal Dichalcogenide Support with Catalytic Metal Nanoparticles To produce an effective electrocatalyst, the crumpled transition metal dichalcogenide sheets can be used as a support for loading of catalytic metal particles. Monodisperse metal atoms can be attached to the crumpled transition metal dichalcogenide support using a spontaneous reduction reaction from a metal salt solution. A method to deposit Ru atoms from an aqueous solution of ruthenium chloride ($RuCl_3$) is described below. However, the method can also be used to deposit other catalytic transition metals, such as Au, Pt, Ir, Pd, Rh, Re, or Os. Further, the transition metal dichalcogenide support can be loaded with two or more different catalytic metals or metal alloys.

Figure 1C:
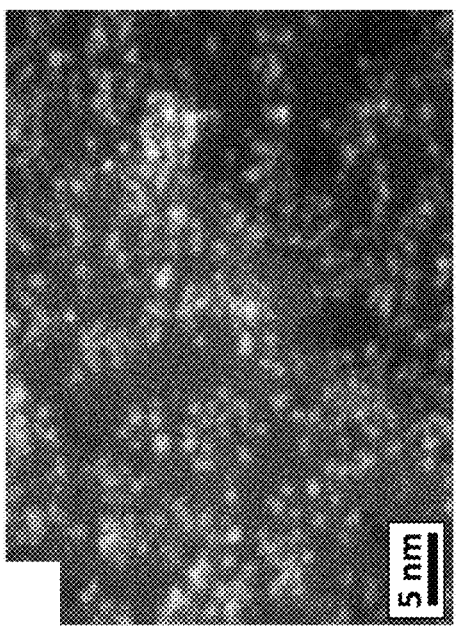
FIG. 1C is a transmission electron microscope (TEM) image of a low loading Ru—MoS$_2$ catalyst.

To establish differential loading of Ru on $MoS_2$, crumples were dispersed in water at 1 mg/mL concentration and stirred with 0.32 mg/mL and 1.37 mg/mL of $RuCl_3$ for the low and high loading concentrations, termed low loading and high loading hereinafter. Due to the anionic nature of exfoliated $MoS_2$, $Ru^{3+}$ cations absorbed electrostatically. $Ru^{3+}$ is spontaneously reduced to $Ru^0$ upon electrostatic attachment, due to electron donation from $MoS_2$ to $Ru^{3+}$, as described below. Excess $RuCl_3$ was removed by washing with DI water. Ru-decoration on $MoS_2$ sheets were visualized using TEM, as shown in FIGS. 1C and 1D, and confirmed with energy dispersive x-ray spectroscopy (EDS). The particle coverage was determined to be 14% and 43% with average particle sizes of 1.06±0.24 nm and 1.25±0.30 nm for the low loading and high loading catalysts, respectively. In general, the nanoparticles can be monodispersed on the surface of the $MoS_2$ support with a controlled coverage of 1 to about 50%.

Electrochemical Behavior of $Ru-MoS_2$ Electrocatalysts

Figure 2A:
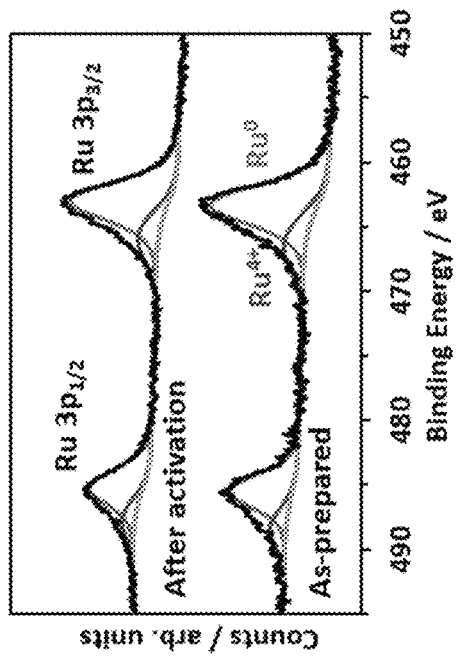
FIG. 2A is a first cyclic voltammogram (CV) scan of low and high loading Ru—MoS$_2$ catalysts showing particle sintering occurring.
Figure 2D:
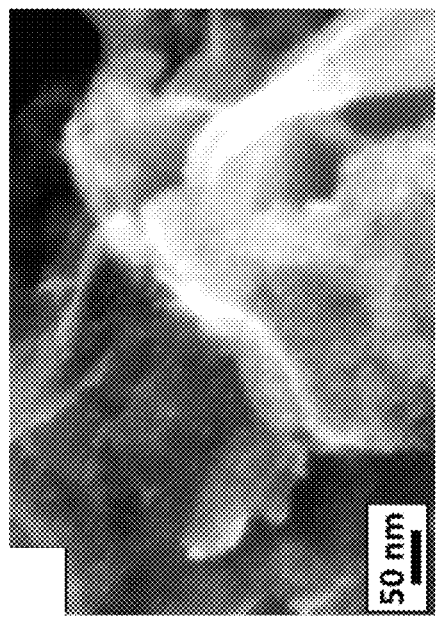
FIG. 2D is an X-ray photoelectron spectroscopy (XPS) spectra in the Ru 3p region of high loading Ru—MoS$_2$ as-prepared catalyst and after being held at −0.65 V vs. Ag/AgCl for 30 min, showing Ru mainly remains unchanged as Ru metal and Ru$^{4+}$ with extensive reduction.
Figure 2B:
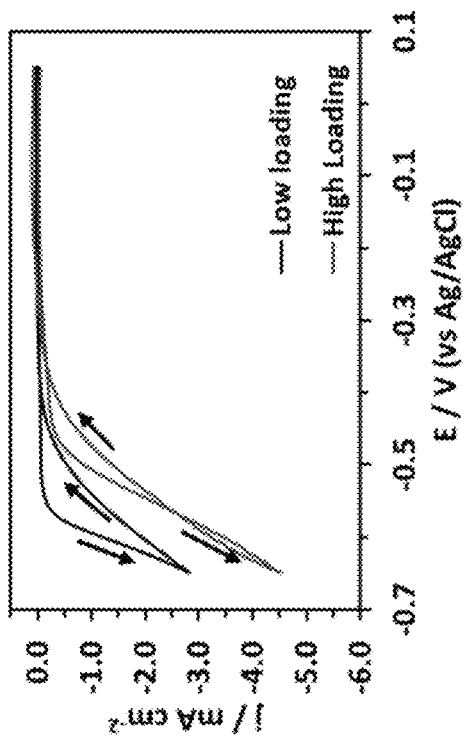
FIG. 2B is an SEM image of low loading and FIG. 2C is an SEM image of high loading catalyst after activation at −0.65 V vs. Ag/AgCl for 30 s, showing different extents of particle sintering.
Figure 2C:
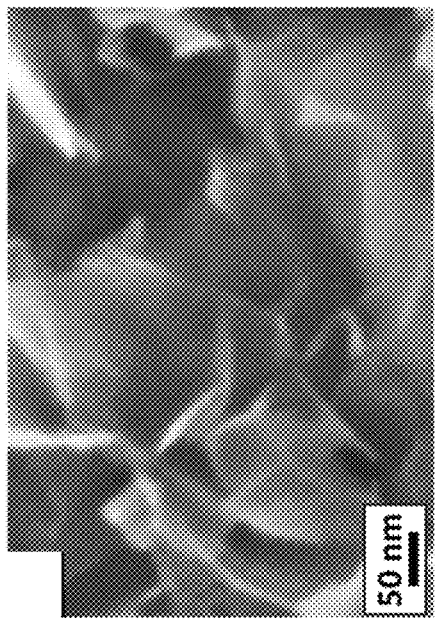

To evaluate the electrochemical behavior of the electrocatalysts, cyclic voltammograms (CV) were obtained, in which the current response is measured while scanning the potential. The CVs were collected in Ar-purged 10 mM HCl with scan rate of 5 mV/s. A unique behavior in the forward scan from 0 V to −0.65 V vs. Ag/AgCl was observed for these electrocatalyst systems, where a sudden increase in current was observed, indicating a fundamental change in catalyst morphology, as shown in FIG. 2A. The increased current was sustained in the reverse scan, indicating a change in the catalyst that is irreversible. In this case, the modified electrocatalyst and increased current serve to promote HER activities, which is deleterious to NRR performance. See C. J. M. van der Ham et al., *Chem. Soc. Rev.* 43(15), 5183 (2014); and J. Deng et al., *Joule* 2(5), 846 (2018). It is believed that upon forward scan, the Ru atoms in the nanoparticles become mobile and undergo electrochemical sintering, resulting in coarsening of the particle size. Thus, the surface energy of the Ru components become irreversibly altered, reducing $N_2$ binding efficiency and the rate limiting step inducing a shift towards HER production. Therefore, HER activity increases and is observed in the sudden increase in the CV current. This sintering effect was only observed in the first scan, with the current levels remaining steady at the same level in subsequent scans. Interestingly, in the low loading catalyst system, the potential at which sintering occurred is more negative than those at higher loadings. Likely, this is due to the distance between the particles for different coverages. Particles with close proximity, as in the higher Ru loading, require less overpotential for sintering to occur. To corroborate these findings, the nanoparticle structures were examined using SEM after applying the sintering potentials, as shown in FIGS. 2B and 2C. The SEM images were collected after −0.65 V vs. Ag/AgCl was applied for 30 s. As shown in FIG. 2B, for the catalyst with low loading, particles were too small to be easily resolved using SEM. On the other hand, as shown in FIG. 2C, for the catalyst with high loading, Ru particles show enlargement vis-à-vis prior TEM images. These results ostensibly corroborate the electrochemical sintering hypothesis, with higher Ru particle densities favoring sintering under applied potentials.

To eliminate changes in Ru's oxidation state as a competing explanation for the altered current levels after the initial sweep, XPS spectra of the as-prepared catalyst and after the potential was applied were compared. As shown in FIG. 2D, the spectrum of the as-prepared catalyst shows $Ru^0$ and some $RuO_2$, which matches the XPS spectrum of the catalyst after bias was applied. These spectra serve to corroborate two things: first, $Ru^{3+}$ was spontaneously reduced when deposited onto $MoS_2$, and second, although the particle size changed, Ru oxidation remained the same. See J. Kim et al., *J. Phys. Chem. Lett.* 4(8), 1227 (2013). Comparing the work function of $MoS_2$ and reduction potential of $Ru^{3+}$ shows this to be a spontaneous reaction. See S. Y. Lee et al., *ACS Nano* 10(6), 6100 (2016); and A. E. Alvarez et al., *ChemCatChem* 9(5), 853 (2017).

Figure 3A:
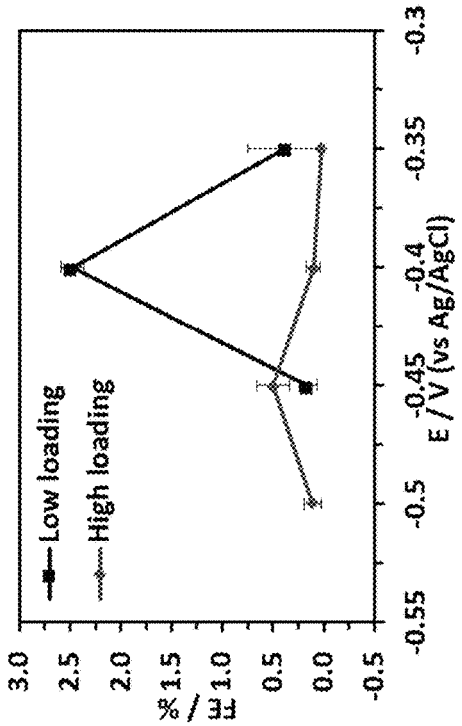
FIG. 3A shows CVs of low and high loading Ru—MoS$_2$ catalysts in Ar or N$_2$-purged 10 mM HCl electrolyte with scan rate of 5 mV/s, showing current enhancement under N$_2$.

An electrochemical cell was created comprising a Ru—$MoS_2$ catalyst-containing working electrode and a counter electrode in an Ar- or $N_2$-purged electrolyte. To benchmark the electrocatalysts for NRR performance, activities in both Ar and $N_2$ atmospheres were compared. Measured current under Ar corresponds to the HER, while $N_2$ purged solutions correspond to both NRR and HER. Cyclic voltammograms of the low and high loading Ru—$MoS_2$ catalysts were collected in Ar and $N_2$-purged 10 mM HCl electrolyte, as shown in FIG. 3A. Both catalysts show increased cathodic current when the solutions are purged with $N_2$, suggesting NRR activity.

Figure 3B:
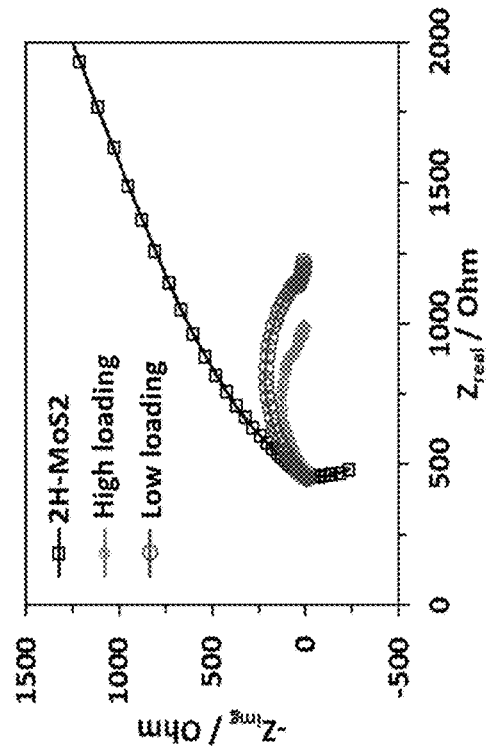
FIG. 3B is a graph of Faradaic efficiencies of Ru—MoS$_2$ catalysts at various applied potentials.
Figure 3C:
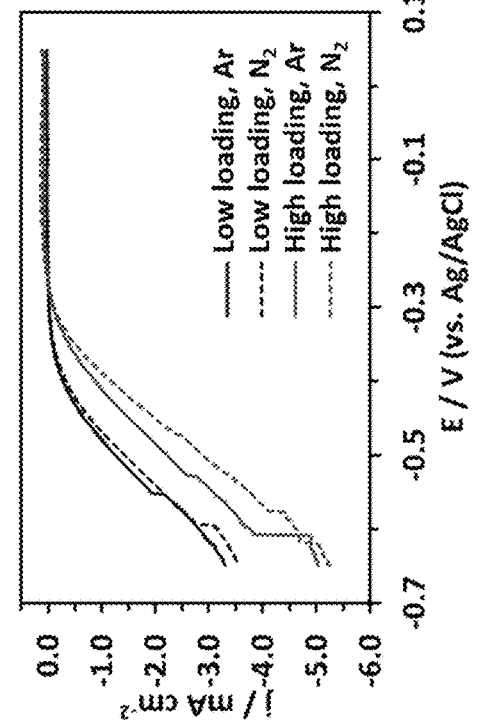
FIG. 3C is a graph of production rates of Ru—MoS$_2$ catalysts at various applied potentials.

The electrochemical NRR activities of the different Ru—$MoS_2$ electrocatalysts were then quantified through bulk electrolysis experiments, with a fixed potential for 1 hour. It was previously reported by Greenlee et al. that background ammonia contribution should be accounted for by careful electrochemical analysis. See L. F. Greenlee et al., *ACS Catal.* 8(9), 7820 (2018). Produced ammonia was quantified using an indophenol colorimetric assay accordingly, which has a detection limit of 68 ppb. In order eliminate background environmental ammonia interfering with quantifying electrochemically produced ammonia, the pre-electrolysis ammonia amount was subtracted out from the post-electrolysis quantified ammonia amount. All electrolysis experiments were proceeded with an initial activation of −0.65 V vs. Ag/AgCl applied for 30 s to allow sintering to take place in advance. The produced $NH_3$ concentration was determined through the colorimetric indophenol assay. The Faradaic efficiencies (FE) and production rates determined for each catalyst at given potentials are shown in FIGS. 3B and 3C and summarized in Table 1. The peak FE for low coverage catalyst is 2.5% at −0.4 V, which is larger than the high loading catalyst's peak FE (0.5% at −0.45 V). Presumably, this is due to a reduced affinity because of particle size changes in the higher loaded catalyst after sintering. This demonstrates that the resulting differences in Ru particle size from different initial coverage greatly affects the NRR activity, which were qualified using DFT.

TABLE 1

Table summarizing the FE and production rates of the electrocatalysts at various potentials.

| | Low Loading Ru-MoS$_2$ | | High Loading Ru-MoS$_2$ | |
|---|---|---|---|---|
| Potential/V (vs Ag/AgCl) | FE/% | Rate (× 10$^9$)/ mmol mg$^{-1}$ s$^{-1}$ | FE/% | Rate (× 10$^9$)/ mmol mg$^{-1}$ s$^{-1}$ |
| −0.35 | 0.37 ± 0.37 | 4.2 ± 4.2 | 0.02 | 0.27 |
| −0.4 | 2.5 ± 0.1 | 20.9 ± 2.6 | 0.10 ± 0.07 | 1.7 ± 1.1 |
| −0.45 | 0.16 ± 0.09 | 6.9 ± 3.7 | 0.50 ± 0.16 | 12.4 ± 3.8 |
| −0.5 | N/A | N/A | 0.11 ± 0.08 | 5.2 ± 2.8 |

Figure 3D:
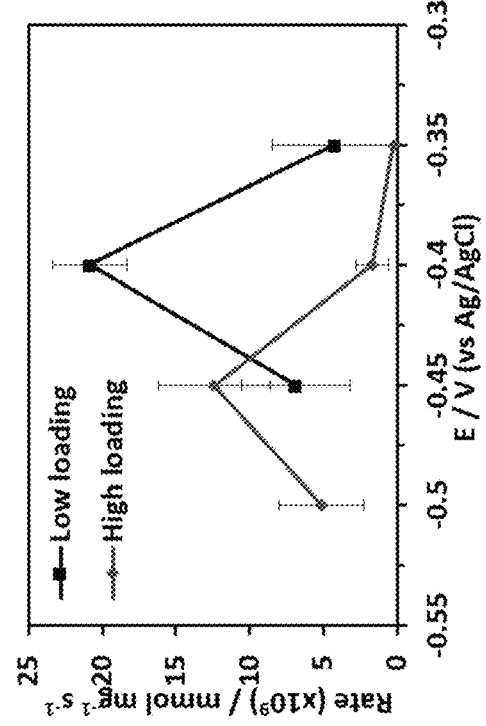
FIG. 3D is a graph of potentiostatic electrochemical impedance spectroscopy (EIS) Nyquist plots at an applied potential of −0.45 V vs. Ag/AgCl for bare 2H—MoS$_2$ and Ru—MoS$_2$ catalysts, showing Ru particles on MoS$_2$ lowers the impedance.

To attribute the reduced NRR activity unambiguously to sintering, and not to changes in charge transfer efficiencies after sintering, impedance measurements were performed on the catalysts. This serves to confirm that a reduction in NRR activity was due to a change in the thermodynamics of the NRR reaction. To examine the effect of Ru loading of $MoS_2$ on impedance, potentiostatic EIS was collected on the low and high Ru loading catalysts and compared to undecorated $MoS_2$ crumples, using a potential of −0.45 V vs. Ag/AgCl in 10 mM HCl. Nyquist plots are shown in FIG. 3D. As expected, undecorated crumpled $MoS_2$, which is in the semiconductor 2H phase, demonstrated a higher impedance due to relative low charge transfer rates. In contrast, crumpled $MoS_2$ decorated with the metallic $Ru^0$ nanoparticles show a reduced impedance with increased $Ru^0$ loading. These results show that despite having larger currents and lower EIS impedance, the high loading Ru—$MoS_2$ catalyst is less active for the NRR. The impedance study serves to remind that despite improved electron transfer with higher Ru loading, it ultimately is not the determining factor in NRR performance. Indeed, a better experimental predictor of NRR is catalyst stability and particle size. Thus, more Ru is not always better.

In order to evaluate the size dependence of the Ru catalysts supported on 2H—$MoS_2$ on HER and NRR activity, the Gibbs free energy for hydrogen and nitrogen adsorption on Ru-single atom and Ru-nanostructure supported on 2H—$MoS_2$, were calculated. These were then compared to the same descriptors evaluated for the bulk Ru catalyst; namely flat Ru(0001) surface and two Ru(0001) step sites. The Gibbs free energy of hydrogen adsorption ($\Delta G_H$) is a well-known descriptor of the HER activity and the highly active HER catalysts are characterized with free energy of hydrogen adsorption close to 0 eV. See J. K. Nørskov et al., *J. Electrochem. Soc.* 152(3), J23 (2005); and J. Greeley et al., *Nat. Mater.* 5, 909 (2006).

TABLE 2

Hydrogen (*H) and nitrogen (*N2) adsorption energy (E) and Gibbs free energy (G) on the sites considered; calculated using optB86b-vdW functional.

| Adsorption Site | $\Delta E_{*H}$/eV | $\Delta_r G_{*H}$/eV | $\Delta E_{*N2}$/eV | $\Delta_r G_{*N2}$/eV |
|---|---|---|---|---|
| Ru (0001) | −0.63 | −0.43 | −0.82 | −0.17 |
| Ru (0001), step1 | −0.65 | −0.45 | −1.12 | −0.47 |
| Ru (0001), step2 | −0.52 | −0.32 | −0.97 | −0.32 |
| ideal MoS$_2$ plain | +1.63 | +1.84 | −0.14 | +0.51 |
| Ru substitution | −0.23 | −0.03 | −0.67 | −0.02 |
| Ru atom on MoS$_2$ | −0.37 | −0.17 | −1.16 | −0.51 |
| Ru plate on MoS$_2$ | −0.91 | −0.71 | −1.47 | −0.82 |

Figure 4:
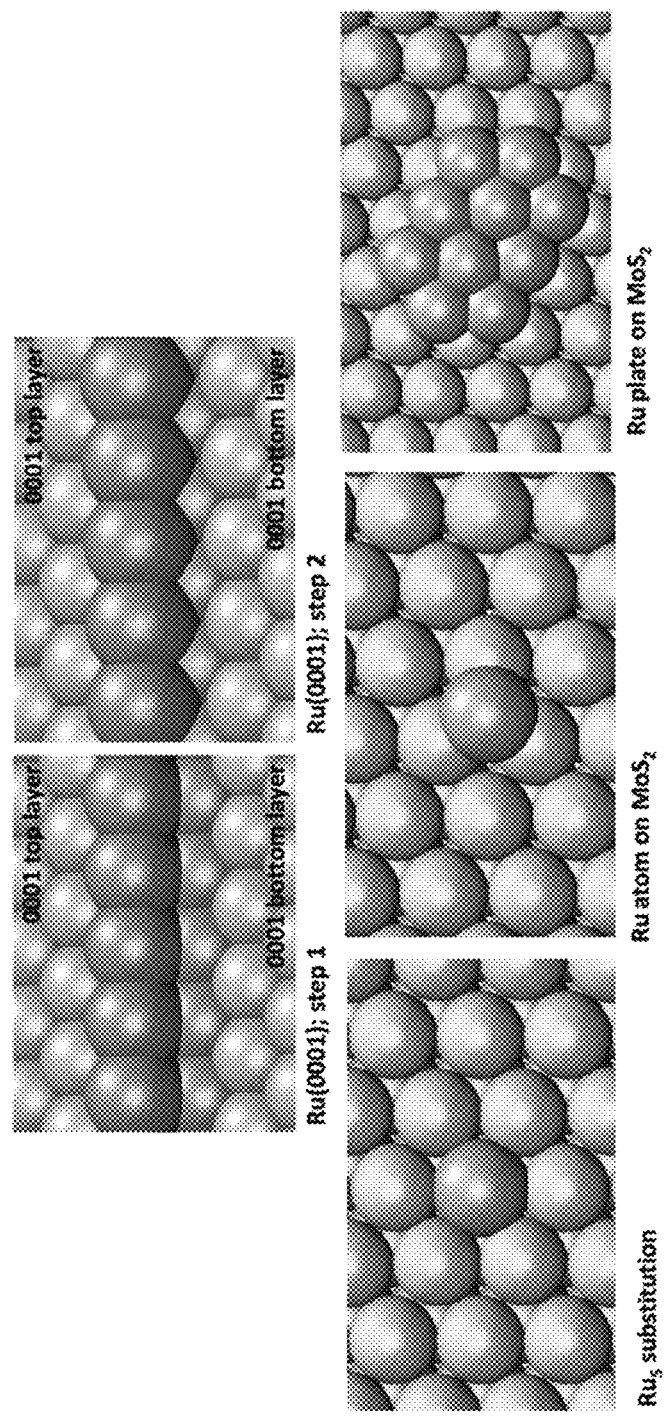
FIG. 4 shows models of the active sites used in DFT calculations: Ru(0001) steps (labeled as step1 and step2), Ru$_S$ substitution, Ru atom supported on 2H—MoS$_2$, and Ru plate supported on 2H—MoS$_2$. The atom colors are pink=Ru, yellow=S, cyan=Mo.
Figure 5B:
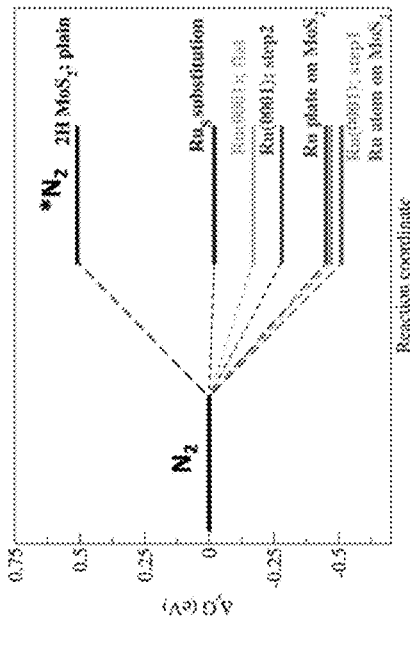
FIG. 5B is a Gibbs free energy diagram for nitrogen adsorption.
Figure 5A:
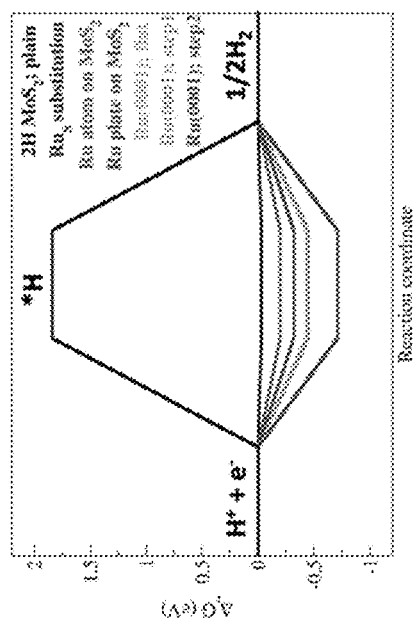
FIG. 5A is a Gibbs free energy diagram for hydrogen evolution reaction.

In this process, Ru incorporation on MoS$_2$ was considered via four distinct structures: first, Ru substitution into the anionic S vacancies (Ru$_S$); second, Ru atom decorated on MoS$_2$; third, Ru nanostructures on MoS$_2$; and fourth, bulk plane, Ru(0001), as shown in FIG. 4. The results shown in FIG. 5A and tabulated in Table 2 indicate that the Ru$_S$ substitution site will have highest HER activity among the studied systems followed by the Ru single atom supported on 2H—MoS$_2$, with $\Delta G_{*H}$ calculated as −0.03 eV and −0.17 eV, respectively, using optB86b-vdW functional. See M. Dion et al., *Phys. Rev. Lett.* 90(24), 246401-1 (2004); J. Klimeš et al., *Phys. Rev. B* 83(19), 195131 (2011); G. Román-Pérez et al., *Phys. Rev. Lett.* 103(9), 096102 (2009); and J. Klimeš et al., *J. Phys. Condens. Matter* 22, 022201 (2010). This implies an electrocatalyst that will favor HER over NRR. Additionally, Ru$_S$ site binds nitrogen weakly; therefore, DFT calculations predict that the Ru$_S$ atom substitution does not provide a viable path for increasing NRR efficiency. Ru single atoms supported on MoS$_2$, on the other hand, have strong interaction with nitrogen molecules; stronger than that of H adatom, as shown in FIG. 5B. In fact, both Ru nanostructure and Ru single atom supported on 2H—MoS$_2$ have strong interaction with N$_2$ molecule similar to the steps on the Ru(0001) surface. See E. Skúlason et al., *Phys. Chem. Chem. Phys.* 14(3), 1235 (2012). The Gibbs free energy of N$_2$ adsorption for Ru atom and Ru nanostructure supported on 2H—MoS$_2$ is calculated as −0.51 eV and −0.45 eV, respectively, while for the two Ru(0001) step sites they are −0.47 eV and −0.32 eV. This overall trend would suggest that as Ru structure sizes increase, one would expect a gradual weakening of N$_2$ adsorption, as exemplified in a reduction in the magnitude of Gibbs free energy of N$_2$ adsorption. These DFT results corroborate the experimental results which show a reduction in NRR activity as particles sinter.

Figure 5D:
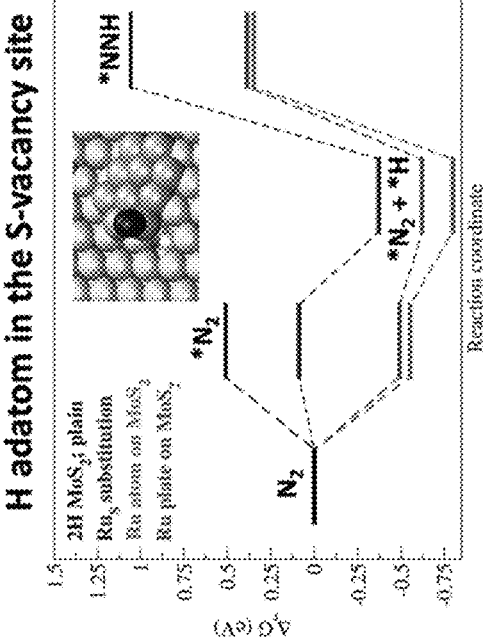
FIG. 5D is a diagram showing the Gibbs free energy change in the case in which H adatoms (*H) adsorbed in the S-vacancy hydrogenate N$_2$ adsorbed on neighboring Ru-site. MoS$_2$ basal plain (black), flat Ru(0001) surface (cyan), steps of Ru(0001) (green and brown), single-atom Ru$_S$ substitution site (blue), single-atom Ru supported on MoS$_2$ (magenta), and Ru plate supported on MoS$_2$ (red); pink atoms=Ru, yellow atoms=S; white atoms=H, blue atoms=N.
Figure 5C:
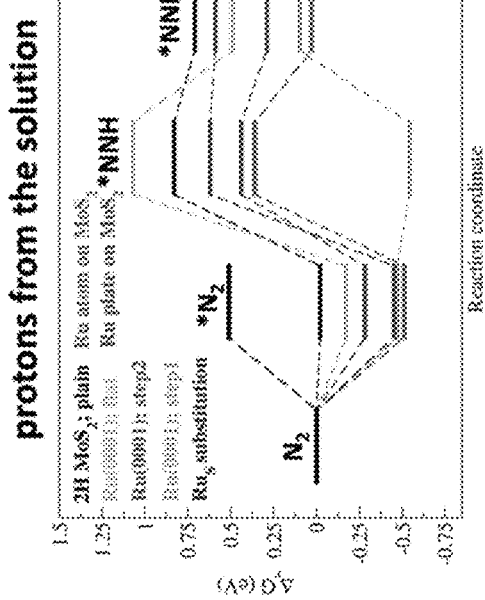
FIG. 5C is a Gibbs free energy diagram for nitrogen adsorption and hydrogenation of adsorbed *N$_2$ and *NNH.
Figure 6:
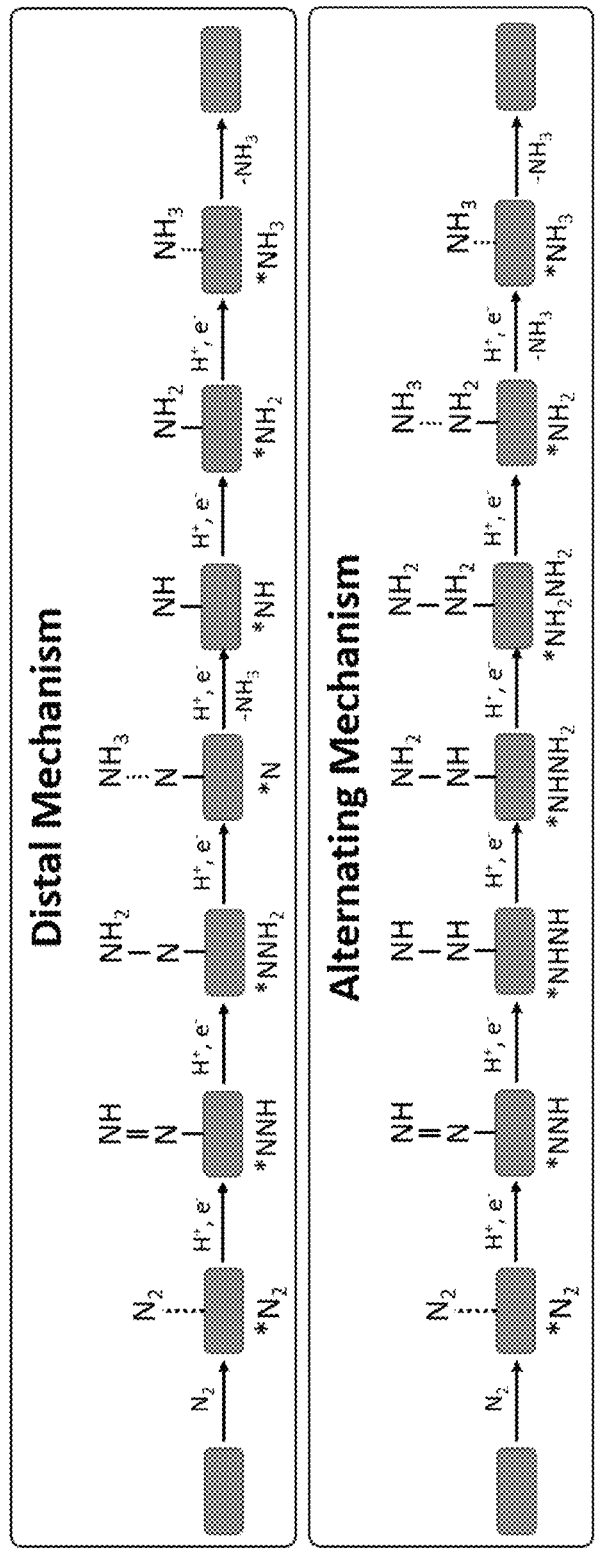
FIG. 6 is a schematic representation of the NRR showing associative pathways, including distal and alternating mechanisms. See S. L. Foster et al., *Nat. Catal.* 1(7), 490 (2018).

The Gibbs free energy for the NRR overpotential determining step on Ru catalysts, namely the hydrogenation of an adsorbed nitrogen atom to form adsorbed *NNH and *NNH$_2$, was also evaluated as shown in FIG. 5C. See E. Skúlason et al., *Phys. Chem. Chem. Phys.* 14(3), 1235 (2012). It is generally accepted that NRR mechanisms can follow the distal or alternating pathways shown in FIG. 6. See E. Skúlason et al., *Phys. Chem. Chem. Phys.* 14(3), 1235 (2012); S. Back and Y. Jung, *Phys. Chem. Chem. Phys.* 18(13), 9161 (2016); I. Matanovic et al., *Appl. Mater. Today* 21, 100812 (2020); and S. L. Foster et al., *Nat. Catal.* 1(7), 490 (2018). For the more energetically favored distal pathway, the rate limiting steps are: first, formation of *NNH and second, formation of *NNH$_2$. The DFT results show that similarly to the step Ru(0001) sites, both Ru atoms and Ru nanostructures supported on 2H—MoS$_2$ offer decreased potential for the thermodynamically limiting step as compared to the flat Ru(0001) surface. Namely, the first hydrogenation step is 1.25 eV uphill in Gibbs free energy on the flat Ru(0001) surface, but is 0.85 eV and 1.05 eV uphill on the single Ru atoms and Ru nanostructure supported on 2H—MoS$_2$. S-vacancies in the vicinity of the Ru nanostructure can serve as the source of hydrogen adatoms for the hydrogenation of adsorbed *N$_2$, as shown in FIG. 5D. See B. H. R. Suryanto et al., *ACS Energy Lett.* 4(2), 430 (2019). In this manner, DFT results for the rate limiting step again corroborate a decrease in NRR efficiency as Ru particles sinter and grow larger. Ultimately, as particles increase in size due to sintering, N$_2$ adsorption is weakened, and the rate limiting step becomes slower.

The DFT analysis additionally shows that S-vacancies in the vicinity of the Ru nanostructure stabilize the *NNH intermediate due to the higher affinity of Ru for NNH, which leads to decreased overpotential for the NRR. Specifically, *NNH is 0.25 eV more stable if the Ru catalyst is in the vicinity of the S-vacancy than when it is supported on defect-free MoS$_2$. This scenario is more likely to occur when there are a large number of smaller particles on the surface compared to a few large particles. In all, DFT results appear to underscore the size effects of metal particles on MoS$_2$ for NRR catalysis. Superficially, that with increased particle size, there appears to be a reduction in NRR activity. This underscores the importance of particle stability in designing NRR electrochemical catalysts.

The present invention has been described as a catalyst comprising a crumpled transition metal dichalcogenide support loaded with monodispersed metal nanoparticles. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An electrocatalyst, comprising a plurality of catalytic metal nanoparticles monodispersed on a surface of a crumpled transition metal dichalcogenide support.

2. The electrocatalyst of claim 1, wherein the transition metal comprises molybdenum, tungsten, cobalt, hafnium, rhenium, platinum, palladium, or zirconium.

3. The electrocatalyst of claim 1, wherein the chalcogenide comprises sulfur, selenium, tellurium, or oxygen.

4. The electrocatalyst of claim 1, wherein the catalytic metal comprises a platinum-group metal.

5. The electrocatalyst of claim 4, wherein the platinum-group metal comprises platinum, iridium, palladium, ruthenium, rhodium, or osmium.

6. The electrocatalyst of claim 1, wherein the plurality of catalytic metal nanoparticles covers from between 1% and 50% of the surface area of the crumpled transition metal dichalcogenide support.

7. The electrocatalyst of claim 1, wherein the size of the catalytic metal nanoparticles is approximately 1 nm.

8. The electrocatalyst of claim 1, wherein the transition metal dichalcogenide comprises molybdenum disulfide and the catalytic metal comprises ruthenium.

9. The electrocatalyst of claim 8, wherein the ruthenium nanoparticles are produced by spontaneous reduction of ruthenium ions on the molybdenum disulfide support.

10. The electrocatalyst of claim 1, wherein the catalytic metal comprises gold or rhenium.

11. A method for preparing hierarchically crumpled sheets of a layered material, comprising
providing exfoliated sheets of the layered material,
sealing the exfoliated sheets in a pressure vessel along with a polar solvent, and
heating the sealed pressure vessel in excess of the boiling temperature of the polar solvent to hydrothermally convert the exfoliated sheets to hierarchically crumpled sheets of the layered material.

12. The method of claim 11, wherein the layered material comprises a metal dichalcogenide.

13. The method of claim 12, wherein the metal comprises Mo, W, Cu, Co, Ni, Ti, Fe, Cr, Zr, Sn, or Ge.

14. The method of claim 12, wherein the chalcogenide comprises O, S, Se, or Te.

15. The method of claim 12, further comprising loading a surface of the hierarchically crumpled sheets of metal dichalcogenide with monodispersed nanoparticles of one or more platinum-group metals or alloys by a spontaneous reduction of the platinum-group metal ions on the surface of the hierarchically crumpled sheets of metal dichalcogenide to provide an electrocatalyst.

16. The method of claim 15, wherein the one or more platinum-group metals comprises platinum, iridium, palladium, ruthenium, rhodium, or osmium.

17. The method of claim 15, wherein the metal dichalcogenide comprises $MoS_2$ and the platinum-group metal comprises Ru.

18. The method of claim 12, further comprising loading a surface of the hierarchically crumpled sheets of metal dichalcogenide with monodispersed nanoparticles of gold or rhenium or alloys thereof by a spontaneous reduction of the gold or rhenium ions on the surface of the hierarchically crumpled sheets of metal dichalcogenide to provide an electrocatalyst.

19. The method of claim 11, wherein the polar solvent comprises water, ethanol, dimethylformamide, or dimethylsulphoxide.

20. The method of claim 11, wherein the layered material comprises graphene or boron nitride.

* * * * *